(12) United States Patent
Cao et al.

(10) Patent No.: US 9,265,039 B2
(45) Date of Patent: Feb. 16, 2016

(54) RESOURCE ELEMENT MAPPING FOR WIRELESS TRANSMISSIONS

(75) Inventors: Jinyu Cao, Beijing (CN); Senjie Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 236 days.

(21) Appl. No.: 13/991,976

(22) PCT Filed: Jun. 1, 2012

(86) PCT No.: PCT/CN2012/076370
§ 371 (c)(1),
(2), (4) Date: Jun. 6, 2013

(87) PCT Pub. No.: WO2013/177788
PCT Pub. Date: Dec. 5, 2013

(65) Prior Publication Data
US 2014/0119330 A1    May 1, 2014

(51) Int. Cl.
*H04W 28/04*    (2009.01)
*H04W 72/04*    (2009.01)
*H04W 72/12*    (2009.01)

(52) U.S. Cl.
CPC ........ *H04W 72/042* (2013.01); *H04W 72/1263* (2013.01)

(58) Field of Classification Search
CPC .. H04W 28/04; H04W 72/04; H04W 72/0446
USPC .................................................. 370/329, 330
See application file for complete search history.

(56) References Cited

U.S. PATENT DOCUMENTS

| | | | |
|---|---|---|---|
| 8,059,728 B2 | 11/2011 | Cho et al. | |
| 8,208,434 B2 | 6/2012 | Sayana et al. | |
| 2011/0124289 A1* | 5/2011 | Balachandran et al. | ..... 455/63.1 |
| 2011/0235603 A1 | 9/2011 | Cheng | |
| 2013/0044701 A1* | 2/2013 | Koorapaty et al. | ........... 370/329 |
| 2013/0114522 A1* | 5/2013 | Frenne et al. | ................. 370/329 |

FOREIGN PATENT DOCUMENTS

| | | | | |
|---|---|---|---|---|
| CN | 101399761 | | 4/2009 | |
| WO | WO 2011/118943 | * | 9/2011 | ............ H04W 88/02 |

OTHER PUBLICATIONS

PCT International Search Report and Written Opinion issued in corresponding PCT/CN2012/076370 issued Mar. 7, 2013 (11 pages).

* cited by examiner

*Primary Examiner* — Ronald B Abelson
(74) *Attorney, Agent, or Firm* — Trop, Pruner & Hu, P.C.

(57) ABSTRACT

Wireless transmissions between a base station and a user equipment device may be performed using resource mapping rules. The resource mapping rules may be generated based on resource block descriptions. The resource block descriptions may be determined by matching symbols included in a resource block to a predefined set of symbol types. The symbol types may be determined based on transmission characteristics.

29 Claims, 7 Drawing Sheets

RESOURCE ELEMENT MAPPING FOR WIRELESS TRANSMISSIONS

BACKGROUND

This relates generally to wireless communication networks.

As mobile and wireless networks grow in popularity, radio and wireless communication standards may be adapted to increasing bandwidth requirements. Such communication standards may enable various electronic devices to use wireless signals to communicate with a data network. For example, an electronic device may establish a wireless connection to a local base station in order to access a broader data network such as the Internet. In addition, multiple electronic devices may use such communication standards to communicate with each other.

BRIEF DESCRIPTION OF THE DRAWINGS

Some embodiments are described with respect to the following figures.

DETAILED DESCRIPTION

In some wireless communication systems, a base station may use resource mapping to perform downlink transmissions. As used herein, "resource mapping" may refer to allocating resources for transmissions to a terminal (e.g., user equipment, mobile station, etc.). For example, resource mapping may include the assignment or reservation of antenna resources to communicate with particular terminals in specific channels and time slots. Conventionally, performing a resource mapping in real time may require complex and time-consuming computations.

In accordance with some embodiments, wireless transmissions may be performed using resource mapping rules. In one or more embodiments, the resource mapping rules may be generated based on resource block descriptions. In some embodiments, the resource block descriptions may be determined by matching symbols included in a resource block to a predefined set of symbol types. In one or more embodiments, such resource mapping rules may enable wireless transmissions to be performed more quickly and efficiently than when using conventional resource mapping techniques.

Figure 1:
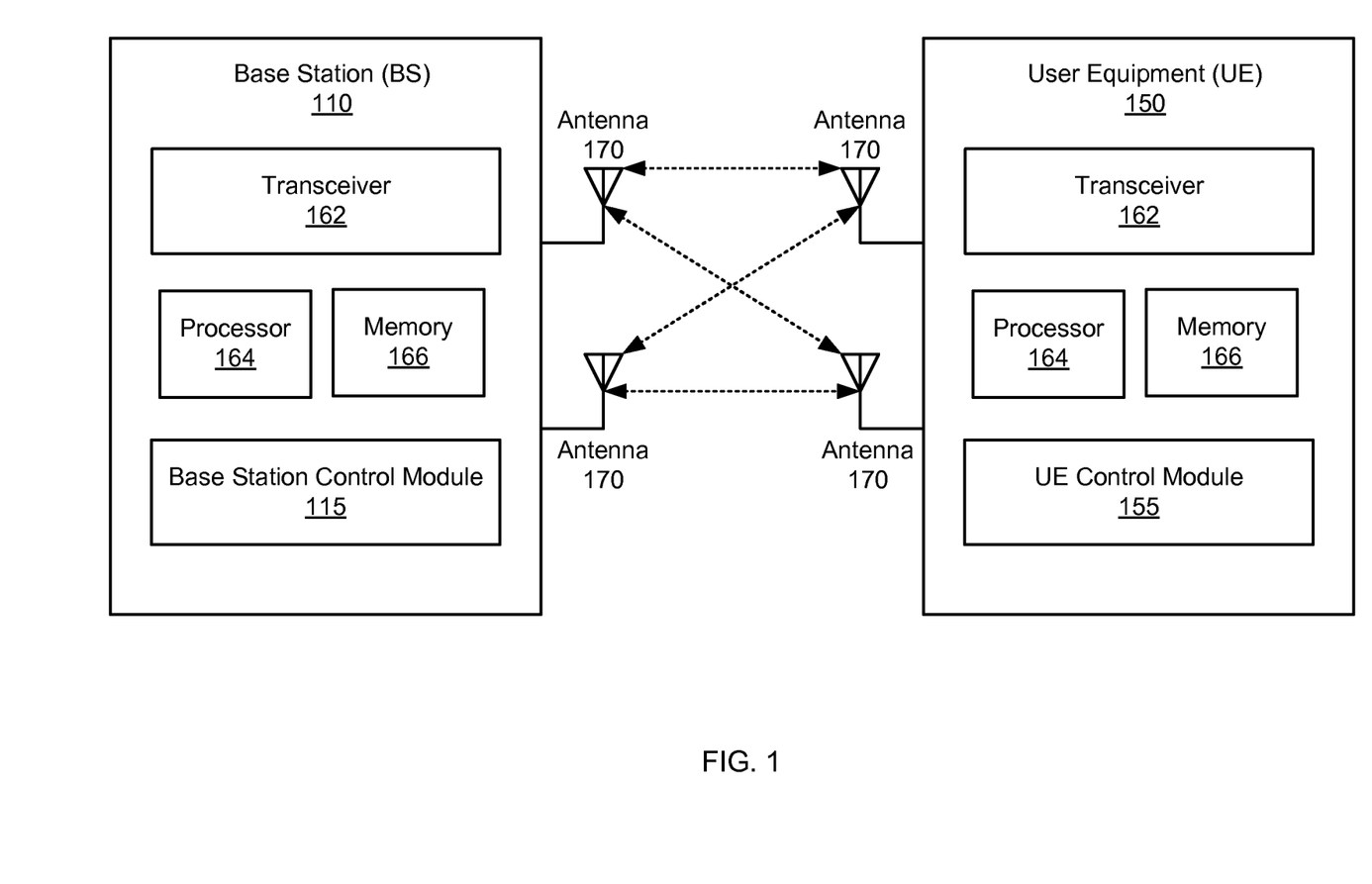
FIG. 1 is a depiction of an example system in accordance with one embodiment.

Referring to FIG. 1, an example system 100 may include a base station 110 and a User Equipment (UE) device 150. In accordance with some embodiments, the UE device 150 may be any electronic device configured to communicate via wireless communications technologies, such as a cellular telephone, a laptop computer or a handheld computer (e.g., a personal digital assistant) with a transceiver (i.e., a radio interface), etc. Further, the UE device 150 may also be any vehicle (e.g., car, truck, boat, etc.) equipped with a radio interface. The base station 110 may provide a wireless interface to a larger network (not shown) such as a core network, a local area network, the Internet, etc. For example, the base station 110 may be an Evolved Node B (eNB), a wireless access point, a cellular tower, etc.

In accordance with some embodiments, the base station 110 and the UE device 150 may each include a transceiver 162, a processor 164, a memory device 166, and one or more antennas 170. In one or more embodiments, the base station 110 may also include a base station control module 115. Further, in one or more embodiments, the UE device 150 may also include a UE control module 155.

In one or more embodiments, the base station control module 115 may include functionality to enable the base station 110 to transmit and receive wireless signals to/from the UE device 150. In accordance with some embodiments, the UE control module 155 may include functionality to enable the UE device 150 to transmit and receive wireless radio signals to/from the base station 110.

In one or more embodiments, the base station control module 115 may include functionality to send downlink transmissions to the UE device 150 using resource mapping rules. Further, in one or more embodiments, the UE control module 155 may include functionality to receive the downlink transmissions using the resource mapping rules. The resource mapping rules in accordance with some embodiments are described further below with reference to FIGS. 2-7.

In one or more embodiments, the wireless transmissions between the base station 110 and the UE device 150 may be Multiple-Input and Multiple-Output (MIMO) transmissions using two or more antennas 170 at each end. Such MIMO transmissions may increase spectral capacity by transmitting multiple data streams simultaneously in the same frequency and time, thereby allowing use of different paths in the radio channel.

The wireless transmissions between the base station 110 and the UE device 150 may be based on any radio communications technologies and/or standards. For example, such wireless signals may include Long Term Evolution (LTE) signals (3rd Generation Partnership Project (3GPP) standards, TS36 version 10.0, published October 2010), Universal Mobile Telecommunications System (UMTS) signals (3GPP standards, TS25 version 10.0, published March 2011), Wi-Fi signals (IEEE (Institute of Electrical and Electronics Engineers) 802.11 standard, IEEE 802.11-2007, published Jun. 12, 2007), Wi-MAX signals (IEEE 802.16 standard, IEEE 802.16-2004, published Oct. 1, 2004), etc.

In one or more embodiments, the UE control module 155 and/or the base station control module 115 may be implemented in hardware, software, and/or firmware. In firmware and software embodiments, they may be implemented by computer executed instructions stored in a non-transitory computer readable medium, such as an optical, semiconductor, or magnetic storage device.

Figure 2:
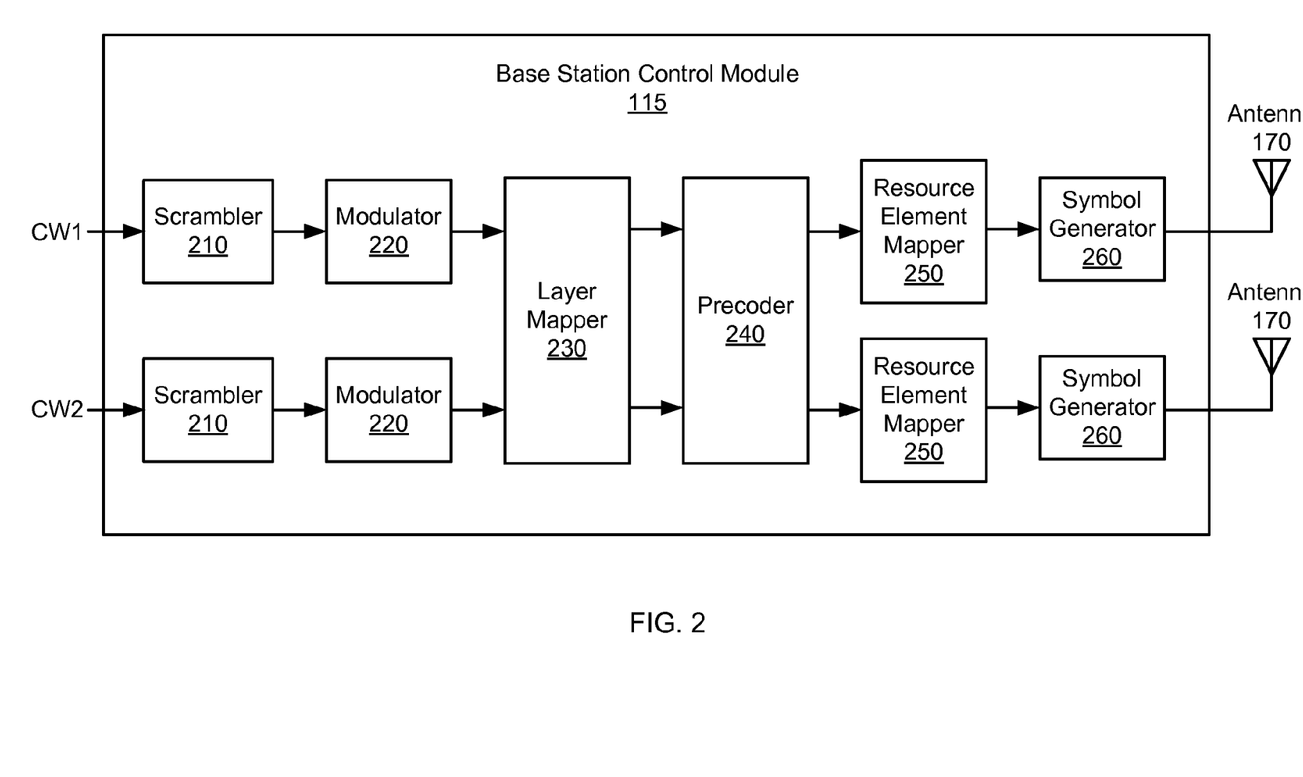
FIG. 2 is a depiction of an example in accordance with one embodiment.

Referring to FIG. 2, an example of transmitting downlink data by a base station control module 115 is shown in accordance to some embodiments. As shown, in this example, the base station control module 115 receives codewords CW1, CW2 to be transmitted to another device (e.g., the UE device 150). As used herein, "codeword" refers to a unit of data prior to formatting for transmission. In some embodiments, a codeword may be received from any source (e.g., an application, a process, an agent, an operating system, a user, etc.) included in the base station 110 or in any other location or device (not shown).

As shown in FIG. 2, in one or more embodiments, each codeword CW1, CW2 is processed by a scrambler 210, a modulator 220, a layer mapper 230, a precoder 240, a resource element mapper 250, and a symbol generators 260. In one or more embodiments, the scrambler 210 may perform scrambling of coded bits in each of the codewords to produce scrambled data. In some embodiments, the modulator 220 may perform modulation on the scrambled data to generate complex-valued modulation symbols. For example, the modulator 220 may use modulation schemes such as Quadrature Phase-Shift Keying (QPSK), Quadrature Amplitude Modulation (QAM), etc.

In one or more embodiments, the layer mapper 230 may map the complex-valued modulation symbols onto one or several transmission layers. Further, in some embodiments, the precoder 240 may perform precoding of the complex-valued modulation symbols to modify layer signals prior to transmission. For example, precoding may be performed for diversity, beamforming, spatial multiplexing, etc.

In one or more embodiments, the resource element mapper 250 may perform mapping of the complex-valued modulation symbols to resource elements. Further, in some embodiments, the symbol generator 260 may map the complex-valued modulation symbols into signals to be transmitted through a corresponding antenna 170. For example, in some embodiments, the complex-valued modulation symbols may be mapped into Orthogonal Frequency-Division Multiplexing (OFDM) signals. After completing processing, each signal may be transmitted using an antenna 170.

In one or more embodiments, the transmitted signal may be described as a sequence of resource blocks. Each resource block may be identified by a unique identifier (e.g., a sequence number). In some embodiments, the resource element mapper 250 may perform resource mapping of each resource block included in the transmitted signal.

Figure 3:
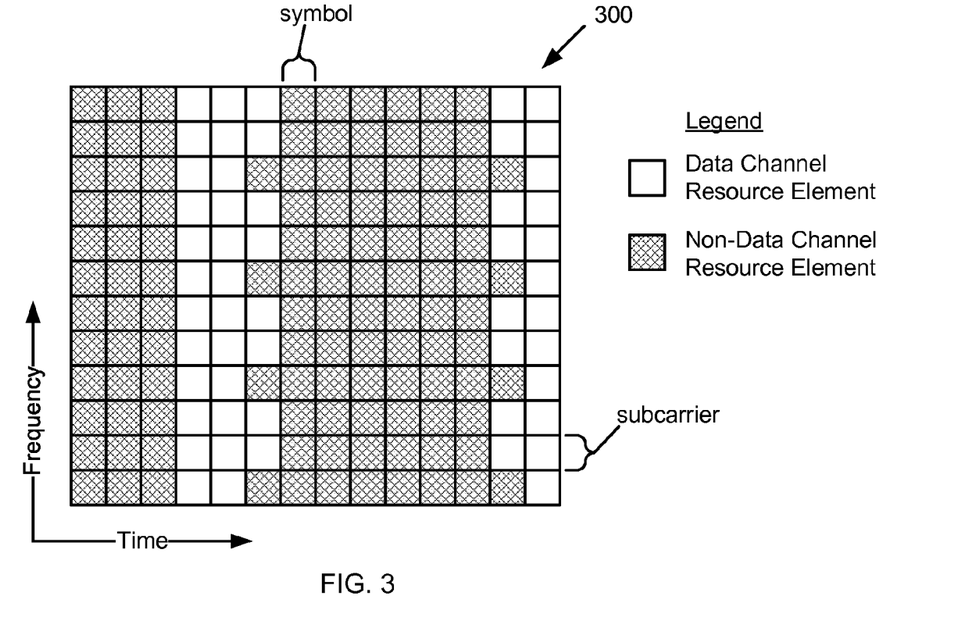
FIG. 3 is a depiction of an example resource mapping in accordance with one embodiment.

Referring to FIG. 3, an example of resource mapping for a resource block 300 is shown in accordance to some embodiments. In one or more embodiments, the resource block 300 may include a specific number of subcarriers (i.e., ranges in the frequency domain), and may include a specific number of symbols (i.e., periods in the time domain). In some embodiments, each combination of subcarrier and symbol may define one resource element (RE). By way of example, the resource block 300 shown in FIG. 3 is depicted as having twelve subcarriers (shown as rows) and fourteen symbols (shown as columns), and thus includes 168 resource elements (shown as squares).

In one or more embodiments, each resource element of a resource block 300 may be mapped to a particular channel. In the example shown in FIG. 3, the resource elements mapped to a data transport channel (e.g., a channel transmitting user data) are depicted as empty squares. Further, the resource elements mapped to non-data channels (i.e., channels not used for data transport) are depicted as squares filled with a cross-hatched pattern.

In one or more embodiments, the data transport channel may be a user data channel such as a Physical Downlink Shared Channel (PDSCH). In addition, in one or more embodiments, the non-data channels may include control channels, maintenance channels, reference channels, etc. For example, such non-data channels may include a Physical Broadcast Channel (PBCH), a Physical Control Format Indicator Channel (PCFICH), a Physical Downlink Control Channel (PDCCH), Reference Signals (RS), Primary Synchronization Signal (PSS), Secondary Synchronization Signal (SSS), etc.

In one or more embodiments, each column of the resource block 300 (referred to as a "symbol") may be represented by a particular symbol type. As used herein, "symbol type" refers to one of several mapping patterns that may be available for a symbol. In some embodiments, determining whether a given symbol type is available for a symbol may be based on transmission characteristics of the symbol.

Figure 4:
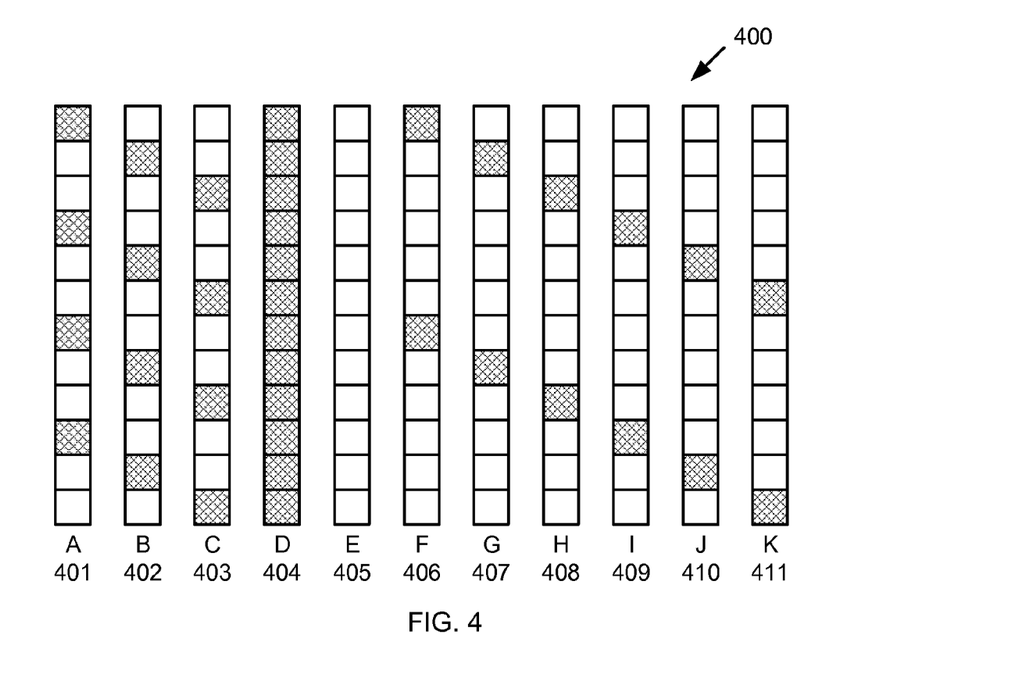
FIG. 4 is a depiction of an example of symbol types in accordance with one embodiment.

In one or more embodiments, all symbol types that may be used for the symbols of a resource block 300 may be grouped in a predefined set of symbol types. Referring to FIG. 4, an example set of symbol types 400 is shown in accordance to some embodiments. In some embodiments, the set of symbol types 400 may be used in, e.g., a LTE wireless system.

In accordance with some embodiments, each symbol type in the set of symbol types 400 may be associated with one or more transmission characteristics. In some embodiments, the transmission characteristics may include, e.g., antenna port(s), symbol number, cell identifier (ID), control format indicator (CFI), etc.

In one or more embodiments, symbol type "A" 401 may be used for a data transport channel (e.g., PDCCH) where the antenna port is equal to 2 or 4, a symbol number is equal to 0, 1, 4, 7, 8, or 11, and cell ID mod 3 is equal to 0.

In one or more embodiments, symbol type "B" 402 may be used for a data transport channel where the antenna port is equal to 2 or 4, a symbol number is equal to 0, 1, 4, 7, 8, or 11, and cell ID mod 3 is equal to 1.

In one or more embodiments, symbol type "C" 403 may be used for a data transport channel where the antenna port is equal to 2 or 4, a symbol number is equal to 0, 1, 4, 7, 8, or 11, and cell ID mod 3 is equal to 2.

In one or more embodiments, symbol type "D" 404 may be used for a non-data transport channel (e.g., PBCH, PCFICH, PDCCH, RS, etc.).

In one or more embodiments, symbol type "E" 405 may be used for a data transport channel where the symbol number is not equal to 0, 1, 4, 7, 8, or 11.

In one or more embodiments, symbol type "F" 406 may be used for a data transport channel where the antenna port is equal to 1, a symbol number is equal to 0, 1, 4, 7, or 11, and cell ID mod 6 is equal to 0.

In one or more embodiments, symbol type "G" 407 may be used for a data transport channel where the antenna port is equal to 1, a symbol number is equal to 0, 1, 4, 7, or 11, and cell ID mod 6 is equal to 1.

In one or more embodiments, symbol type "H" 408 may be used for a data transport channel where the antenna port is equal to 1, a symbol number is equal to 0, 1, 4, 7, or 11, and cell ID mod 6 is equal to 2.

In one or more embodiments, symbol type "I" 409 may be used for a data transport channel where the antenna port is equal to 1, a symbol number is equal to 0, 1, 4, 7, or 11, and cell ID mod 6 is equal to 3.

In one or more embodiments, symbol type "J" 410 may be used for a data transport channel where the antenna port is equal to 1, a symbol number is equal to 0, 1, 4, 7, or 11, and cell ID mod 6 is equal to 4.

In one or more embodiments, symbol type "K" 411 may be used for a data transport channel where the antenna port is equal to 1, a symbol number is equal to 0, 1, 4, 7, or 11, and cell ID mod 6 is equal to 5.

In accordance with some embodiments, a resource mapping may be represented by an ordered array of symbol types. For example, referring to FIG. 3, each symbol of the resource block 300 may be represented by an identifier associated with one of the symbol types shown in FIG. 4. Note that the first, second and third symbols (i.e., columns) of the resource block 300 match the symbol type "D" 404, the fourth symbol matches the symbol type "E" 405, the fifth symbol matches the symbol type "C" 403, and so on. Accordingly, the resource mapping of the resource block 300 may be described by the ordered array [D, D, D, E, C, D, D, D, D, D, D, C, E, E], where each letter in the array represents a different symbol type. Such ordered arrays may be referred to herein as "resource block descriptions."

In accordance with some embodiments, the base station control module 115 may generate resource mapping rules. As used herein, "resource mapping rules" may refer to a stored data structure defining resource block descriptions for sets of resource blocks. For example, the resource mapping rules may specify that a single resource block description (e.g., "[D, D, D, E, C, D, D, D, D, D, D, C, E, E]") may be applied to a sequence or range of resource blocks (e.g., RB1 to RB30, RB40-RB90, etc.). In another example, the resource mapping rules may specify that a first resource block description may be applied to a first range of resource blocks, and a second resource block description may be applied to a second range of resource blocks. In one or more embodiments, determining the resource mapping rules may be based on information about the resource block (e.g., resource block descriptions, resource block start locations, resource block numbers, frame numbers, subframe numbers, etc.). In some embodiments, the base station control module 115 may generate the resource mapping rules using parallel processing techniques.

In one or more embodiments, the resource block descriptions and/or the resource mapping rules may be transmitted to the UE device 150. Further, in some embodiments, the resource block descriptions and/or the resource mapping rules may be stored in the base station 110 and/or the UE device 150 (e.g., in memory 166). In some embodiments, the base station 110 and the UE device 150 may each agree to use the resource block descriptions and/or the resource mapping rules for any subsequent transmissions.

Note that the examples shown in FIGS. 1 and 2 are provided for the sake of illustration, and are not intended to limit any embodiments. For example, embodiments may include any number and/or arrangement of UE devices 150 and/or base stations 110. In another example, the functionality of the base station control module 115 described above may be implemented by any other component of base station 110 or UE device 150. In yet another example, it is contemplated that resource mapping rules may refer to any number of resource block descriptions and/or any number or ranges of resource blocks. Further, it is contemplated that specifics in the examples may be used anywhere in one or more embodiments.

Figure 5:
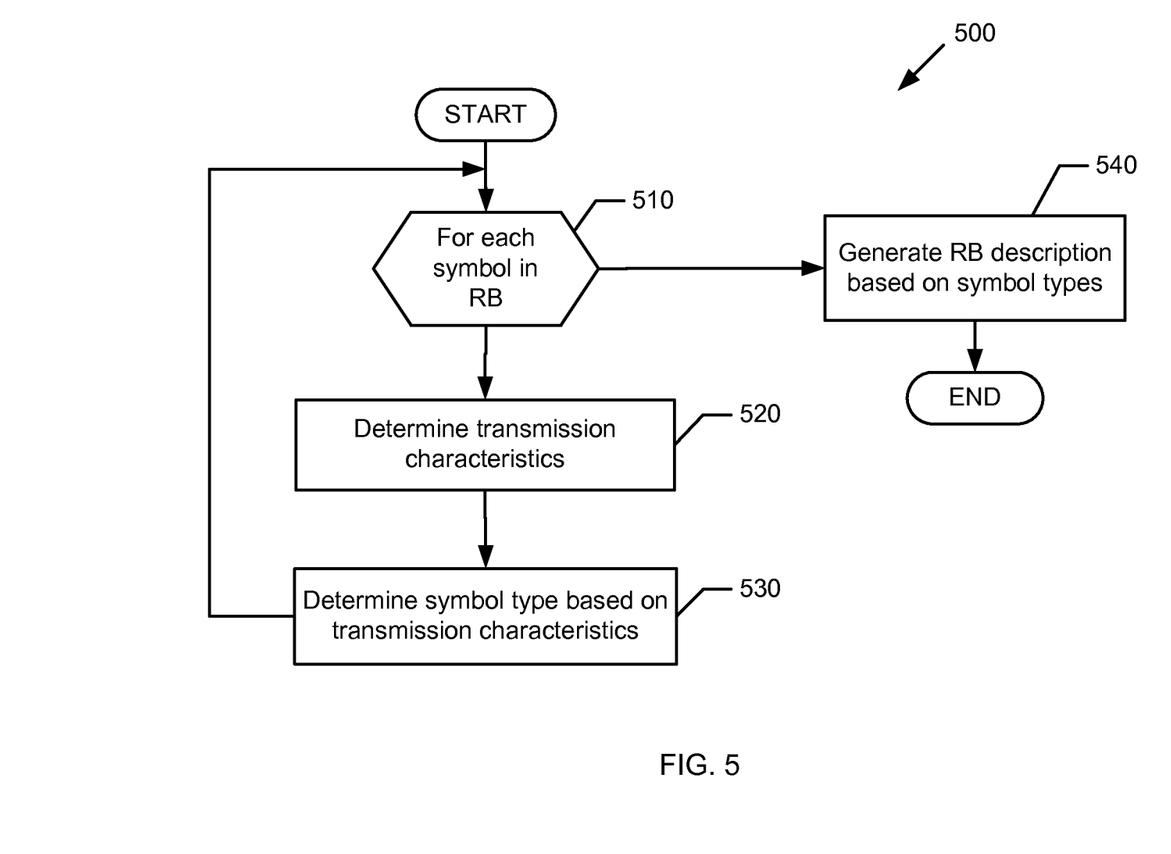
FIG. 5 is a flow chart in accordance with one embodiment.

FIG. 5 shows a sequence 500 for resource mapping in accordance with one or more embodiments. In one embodiment, the sequence 500 may be part of the base station control module 115 shown in FIG. 1. In other embodiments, the sequence 500 may be implemented by any other component of base station 110 or UE device 150. The sequence 500 may be implemented in hardware, software, and/or firmware. In firmware and software embodiments it may be implemented by computer executed instructions stored in a non-transitory computer readable medium, such as an optical, semiconductor, or magnetic storage device.

At step 510, a loop to process each symbol in a resource block may be entered. In one or more embodiments, the resource block may be a unit of data to be transmitted to a UE device using a wireless standard (e.g., LTE, UMTS, etc.). For example, referring to FIGS. 1 and 3, the base station control module 115 may process each symbol in resource block 300. In one or more embodiments, each symbol may be identified by a symbol number (e.g., 1, 2, 3, etc.).

At step 520, transmission characteristics may be determined. For example, referring to FIG. 1, the base station control module 115 may determine the antenna port to be used, the symbol number, the cell id, the CFI, etc.

At step 530, a symbol type may be determined based on the transmission characteristics. For example, referring to FIGS. 1 and 4, the base station control module 115 may determine which symbol type (e.g., symbol type "A" 401, symbol type "B" 402, etc.) is associated with the transmission values (e.g., symbol number, antenna port, cell id, CFI, etc.). After step 530, the loop returns to step 510 to process the next symbol.

Once each symbol in the resource block is processed through the loop, the sequence 500 continues at step 550. At step 540, a resource block description is generated based on the symbol type of each symbol of the resource block (determined at step 530). For example, referring to FIGS. 1 and 3, the base station control module 115 may generate an array of symbol identifiers (e.g., "[D, D, D, E, C, D, D, D, D, D, D, C, E, E]") to describe the resource mapping of the resource block 300. After step 540, the sequence 500 ends.

Figure 6:
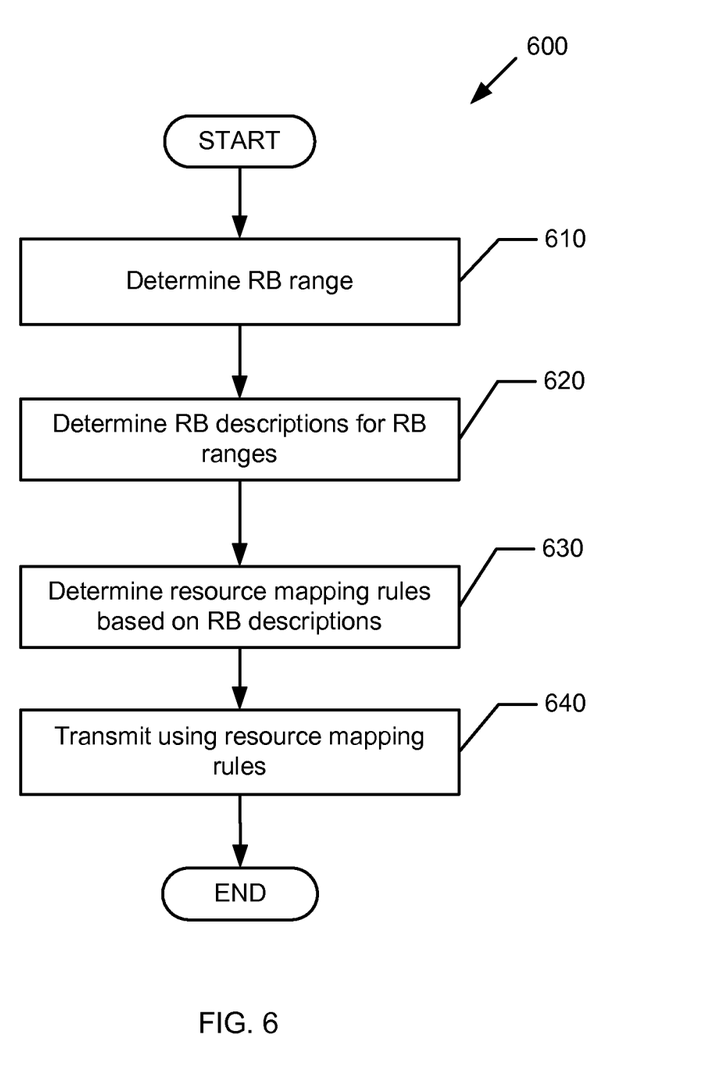
FIG. 6 is a flow chart in accordance with one embodiment.

FIG. 6 shows a sequence 600 for wireless transmission in accordance with one or more embodiments. In one embodiment, the sequence 600 may be part of the base station control module 115 shown in FIG. 1. In other embodiments, the sequence 600 may be implemented by any other component of base station 110 or UE device 150. The sequence 600 may be implemented in hardware, software, and/or firmware. In firmware and software embodiments it may be implemented by computer executed instructions stored in a non-transitory computer readable medium, such as an optical, semiconductor, or magnetic storage device.

At step 610, the range of resource blocks assigned to a UE device is determined. In one or more embodiments, the range of resource blocks may be specified in terms of a beginning and ending resource block within a sequence of frames and/or sub-frames. For example, referring to FIG. 1, the base station control module 115 may determine that a range of resource blocks (e.g., RB1 to RB30) is assigned for downlink transmissions to the UE device 150.

At step 620, one or more resource block descriptions may be determined for the range of resource blocks. For example, referring to FIG. 1, the base station control module 115 may determine that each resource block in the assigned range (determined at step 610) may be described by the same resource block description (e.g., "[D, D, D, E, C, D, D, D, D, D, D, C, E, E]"). In one or more embodiments, this resource block description may be determined using the sequence 500 described above with reference to FIG. 5. In another example, the base station control module 115 may determine that a first portion of the resource blocks in the assigned range may be described by a first resource block description, and the remaining portion of resource blocks may be described by a second resource block description. In still another example, the base station control module 115 may determine that the resource blocks in the assigned range may be described by three different resource block descriptions.

At step 630, resource mapping rules may be determined based on the resource block descriptions (determined at step 620). For example, referring to FIG. 1, the base station control module 115 may generate resource mapping rules specifying that the resource block description "[D, D, D, E, C, D, D, D, D, D, D, C, E, E]" applies to resource block range RB1 to RB30. In one or more embodiments, determining the resource mapping rules may also be based on additional information about the resource blocks (e.g., resource block start locations, resource block numbers, frame numbers, subframe numbers, etc.).

At step 640, a transmission may be performed using the resource mapping rules (determined at step 630). For example, referring to FIG. 1, the base station control module 115 may use the resource mapping rules for a downlink transmission to the UE device 150. After step 640, the sequence 600 ends.

Figure 7:
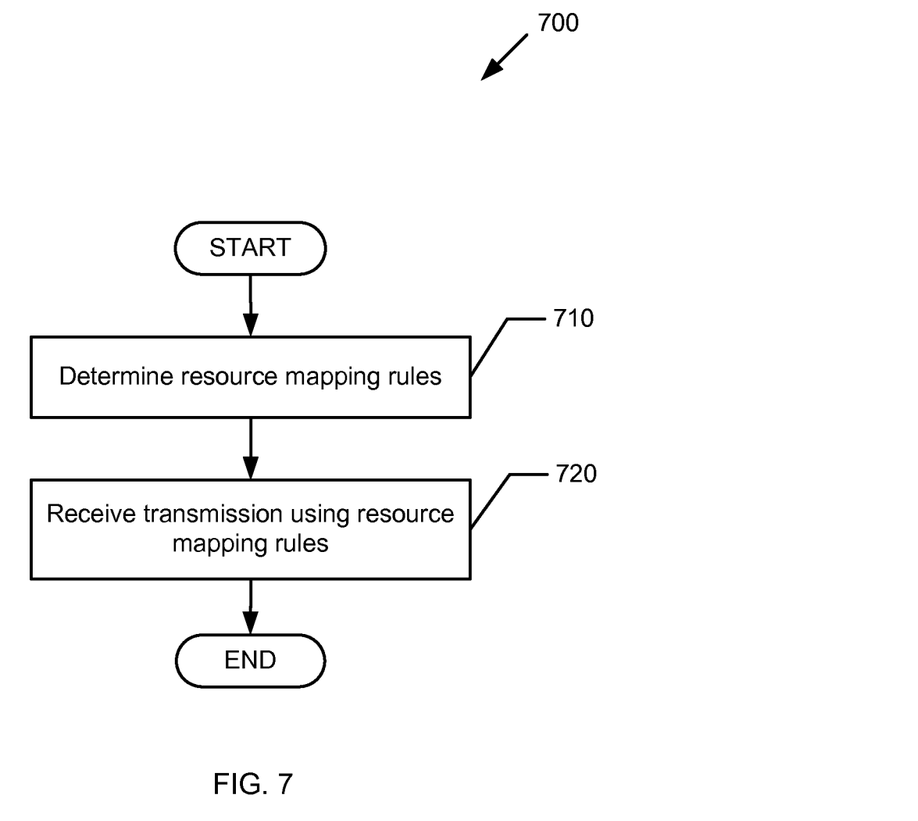
FIG. 7 is a flow chart in accordance with one embodiment.

FIG. 7 shows a sequence 700 for wireless reception in accordance with one or more embodiments. In one embodiment, the sequence 700 may be part of the UE control module 155 shown in FIG. 1. In other embodiments, the sequence 700 may be implemented by any other component of base station 110 or UE device 150. The sequence 700 may be implemented in hardware, software, and/or firmware. In firmware and software embodiments it may be implemented by computer executed instructions stored in a non-transitory computer readable medium, such as an optical, semiconductor, or magnetic storage device.

At step 710, resource mapping rules for a downlink transmission may be received. For example, referring to FIG. 1, the UE control module 155 may receive a set of resource mapping rules from the base station 110. In one or more embodiments, the received resource mapping rules may be stored in the memory 166 included in the UE device 150.

At step 720, a wireless transmission may be received using the resource mapping rules (received at step 710). In one or more embodiments, receiving the transmission may include de-mapping the downlink transmission using the resource mapping information included in the resource mapping rules. For example, referring to FIG. 1, the UE control module 155 may use the resource mapping rules to receive one or more downlink transmissions from the base station 110. After step 720, the sequence 700 ends.

Figure 8:
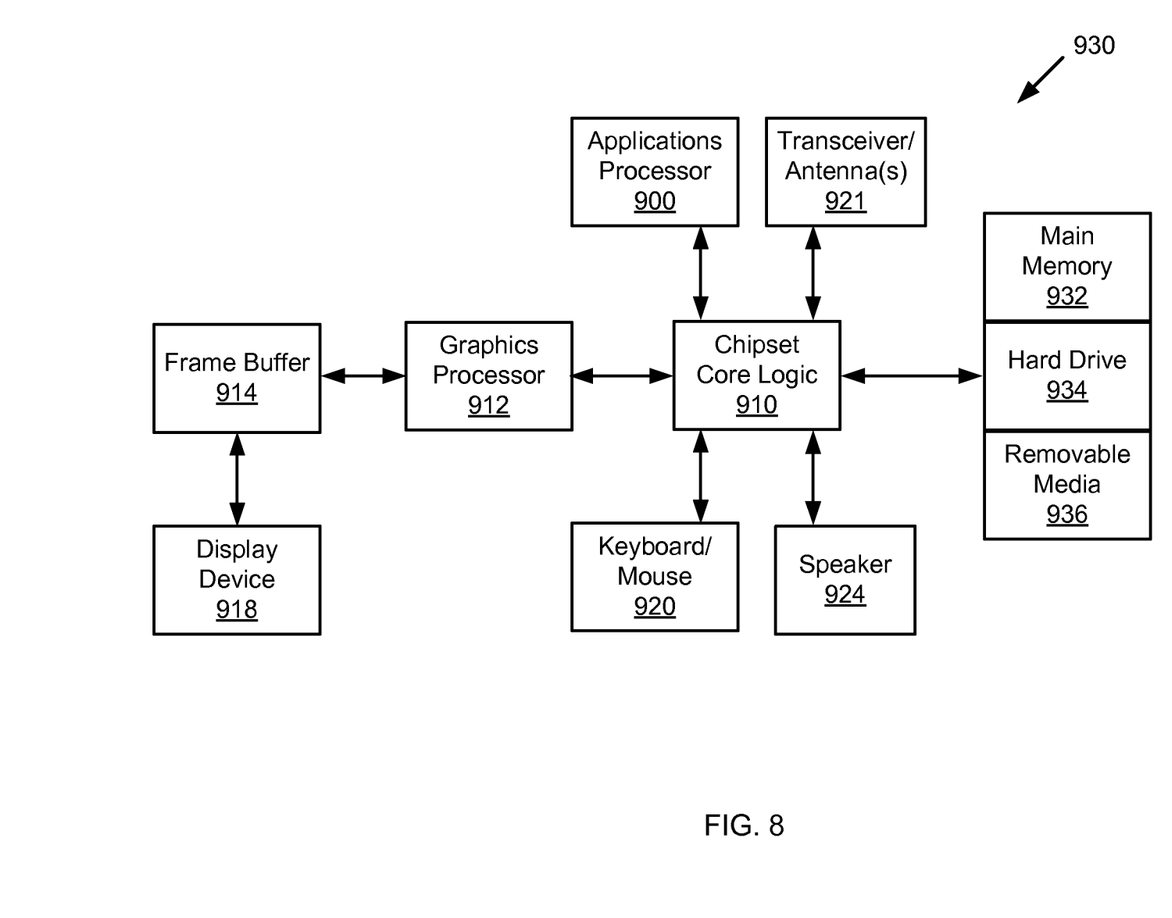
FIG. 8 is a schematic depiction of a wireless device and/or a base station in accordance with one embodiment.

FIG. 8 depicts a computer system 930, which may be the UE device 150 and/or the base station 110 shown in FIG. 1. The computer system 930 may include a hard drive 934 and a removable storage medium 936, coupled by a bus (shown as an arrow) to a chipset core logic 910. A keyboard and/or mouse 920, or other conventional components, may be coupled to the chipset core logic. The core logic may couple to the graphics processor 912, and the applications processor 900 in one embodiment. The graphics processor 912 may also be coupled to a frame buffer 914. The frame buffer 914 may be coupled to a display device 918, such as a liquid crystal display (LCD) touch screen. In one embodiment, the graphics processor 912 may be a multi-threaded, multi-core parallel processor using single instruction multiple data (SIMD) architecture.

The chipset logic 910 may include a non-volatile memory port to couple to the main memory 932. Also coupled to the core logic 910 may be a radio transceiver and antenna(s) 921, 922. Speakers 924 may also be coupled to core logic 610.

The following clauses and/or examples pertain to further embodiments. One example embodiment may be a method for wireless transmission, including: obtaining, by a hardware processor, transmission characteristics for each symbol in a resource block; for each symbol in the resource block, determining, by the hardware processor, a symbol type based on the transmission characteristics; and determining, by the hardware processor, a resource block description based on the symbol type of each symbol in the resource block. The method may include generating resource mapping rules based on the resource block description. The method may include transmitting data using the resource mapping rules. The method may include transmitting the data using at least one antenna. The resource mapping rules may include a data structure defining, for each of one or more sets of resource blocks, a resource block description. The method may include storing the resource mapping rules in a physical memory device. The method may include generating the resource mapping rules also based on at least one resource block start location. The method may include generating the resource mapping rules also based on at least one resource block number. The method may include generating the resource mapping rules also based on at least one subframe number. The resource block description may be an ordered array of identifiers, each identifier corresponding to a symbol type of each symbol in the resource block. The symbol type of each symbol may represent a resource mapping of the symbol. The resource mapping may specify a number of resource elements assigned to a data channel. The data channel may be a Physical Downlink Shared Channel (PDSCH) channel. The resource mapping may specify a number of resource elements assigned to one or more non-data channels. The one or more non-data channels may be selected from a group consisting of a Physical Broadcast Channel (PBCH), a Physical Control Format Indicator Channel (PCFICH), and a Physical Downlink Control Channel (PDCCH). Determining the symbol type may comprise selecting one of a set of symbol types. The set of symbol types may be a predefined group of all symbol types that may be used for the resource block.

Another example embodiment may be a machine readable medium including a plurality of instructions that in response to being executed by a computing device, cause the computing device to carry out the above described method.

Yet another example embodiment may be a base station including an antenna and a control module coupled to the antenna, the control module to: obtain transmission characteristics for each symbol in a resource block; for each symbol in the resource block, determining a symbol type based on the transmission characteristics; and determining a resource block description based on the symbol type of each symbol in the resource block. The control module may also be to determine resource mapping rules based on the resource block description. The control module may also be to transmit the resource mapping rules to a wireless device. The control module may also be to send, via the at least one antenna, a downlink transmission to a wireless device using the resource mapping rules. The base station may also include a memory device to store the resource block description. The control module may also be to use a Long-term Evolution (LTE) wireless protocol. The resource block description may comprise an ordered array of identifiers. Each identifier of the ordered array of identifiers may correspond to a symbol type of each symbol in the resource block. The transmission characteristics may comprise at least one antenna port. The transmission characteristics may comprise a cell identifier. The transmission characteristics may comprise a symbol number. The transmission characteristics may comprise a control format indicator (CFI).

Still another example embodiment may be a wireless device including an antenna and a control module coupled to the antenna, the control module to: receive resource mapping rules from a base station, and receive a downlink transmission from the base station using the resource mapping rules, where the resource mapping rules are based on at least one resource block description. The resource block description may comprise an ordered array of identifiers, where each identifier corresponds to a symbol type of each symbol in at least one resource block.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Further-more, the particular features, structures, or characteristics may be instituted in other suitable forms other than the particular embodiment illustrated and all such forms may be encompassed within the claims of the present application.

While the present invention has been described with respect to a limited number of embodiments for the sake of illustration, those skilled in the art will appreciate numerous modifications and variations therefrom. For example, it is contemplated that the above described processes may be performed at any location(s) in the network (e.g., at a UE device 150 level, at a base station 110 level, at a network level, or any combination thereof). In another example, the above described functionality of the UE device 150 and/or the base station 110 may be implemented in any other wireless device(s) (e.g., user equipment, mobile telephone, personal communication device, computer, node, relay, repeater, router, etc.). It is intended that the appended claims cover all such modifications and variations as fall within the true spirit and scope of this present invention.

What is claimed is:

1. A method for wireless transmission, comprising:
   obtaining, by a hardware processor, transmission characteristics for each symbol in a resource block;
   for each symbol in the resource block, determining, by the hardware processor, a symbol type based on the transmission characteristics;
   determining, by the hardware processor, a resource block description based on the symbol type of each symbol in the resource block;
   storing the resource mapping rules in a physical memory device; and
   generating resource mapping rules based on the resource block description.

2. The method of claim 1 including transmitting data using the resource mapping rules.

3. The method of claim 2 including transmitting the data using at least one antenna.

4. The method of claim 1, wherein the resource mapping rules comprise a data structure defining, for each of one or more sets of resource blocks, a resource block description.

5. The method of claim 1, wherein generating the resource mapping rules is also based on at least one resource block start location.

6. The method of claim 1, wherein generating the resource mapping rules is also based on at least one resource block number.

7. The method of claim 1, wherein generating the resource mapping rules is also based on at least one subframe number.

8. The method of claim 1, wherein the resource block description comprises an ordered array of identifiers, each identifier corresponding to a symbol type of each symbol in the resource block.

9. The method of claim 1, wherein the symbol type of each symbol represents a resource mapping of the symbol.

10. The method of claim 9, wherein the resource mapping specifies a number of resource elements assigned to a data channel.

11. The method of claim 10, wherein the data channel is a Physical Downlink Shared Channel (PDSCH) channel.

12. The method of claim 9, wherein the resource mapping specifies a number of resource elements assigned to one or more non-data channels.

13. The method of claim 12, wherein the one or more non-data channels are selected from a group consisting of a Physical Broadcast Channel (PBCH), a Physical Control Format Indicator Channel (PCFICH), and a Physical Downlink Control Channel (PDCCH).

14. The method of claim 1, wherein the set of symbol types is a predefined group of all symbol types that may be used for the resource block.

15. At least one machine readable medium comprising a plurality of instructions that in response to being executed by a computing device, cause the computing device to carry out a method comprising:
   obtaining, by a hardware processor, transmission characteristics for each symbol in a resource block;
   for each symbol in the resource block, determining, by the hardware processor, a symbol type based on the transmission characteristics;
   determining, by the hardware processor, a resource block description based on the symbol type of each symbol in the resource block;
   wherein the symbol type of each symbol represents a resource mapping of the symbol; and
   wherein the resource mapping specifies a number of resource elements assigned to one or more non-data channels.

16. A base station comprising:
   at least one antenna; and
   a control module coupled to the at least one antenna, the control module to:
   receive a plurality of resource blocks,
   wherein the control module is to determine the ordered array of symbol types for each resource block based on one or more transmission characteristics of the resource block,
   determine an ordered array of symbol types for each resource block of the plurality of resource blocks,
   generating resource mapping rules based on the ordered array for each resource block of the plurality of resource blocks.

17. The base station of claim 16, wherein the control module is also transmit the resource mapping rules to a wireless device.

18. The base station of claim 16, wherein the control module is also to send, via the at least one antenna, a downlink transmission to a wireless device using the resource mapping rules.

19. The base station of claim 16 including a memory device to store the resource mapping rules.

20. The base station of claim 16, wherein the transmission characteristics comprise at least one antenna port.

21. The base station of claim 16, wherein the transmission characteristics comprise a cell identifier.

22. The base station of claim 16, wherein the transmission characteristics comprise a symbol number.

23. The base station of claim 16, wherein the transmission characteristics comprise a control format indicator (CFI).

24. A wireless device comprising:
   an antenna; and
   a control module coupled to the antenna, the control module to:
   receive resource mapping rules from a base station; and
   receive a downlink transmission from the base station using the resource mapping rules,
   wherein the resource mapping rules are based on at least one resource block description, wherein the resource block description comprises an ordered array of identifiers, each identifier corresponding to a symbol type of each symbol in at least one resource block.

25. The wireless device of claim 24, said module to generate resource mapping rules based on the resource block description.

26. The wireless device of claim 25, said module to store the resource mapping rules in a physical memory device.

27. The wireless device of claim 25, said module to generate the resource mapping rules is also based on at least one resource block start location.

28. The wireless device of claim 25, said module to generate the resource mapping rules is also based on at least one resource block number.

29. The wireless device of claim 25, said module to generate the resource mapping rules is also based on at least one subframe number.

* * * * *